(12) United States Patent
Gerpheide

(10) Patent No.: US 9,605,878 B2
(45) Date of Patent: Mar. 28, 2017

(54) MINING SYSTEM WITH SUSTAINABLE ENERGY RESERVOIR LEGACY

(71) Applicant: George E. Gerpheide, Cottonwood Heights, UT (US)

(72) Inventor: George E. Gerpheide, Cottonwood Heights, UT (US)

(*) Notice: Subject to any disclaimer, the term of this patent is extended or adjusted under 35 U.S.C. 154(b) by 349 days.

(21) Appl. No.: 14/357,847

(22) PCT Filed: Nov. 21, 2012

(86) PCT No.: PCT/US2012/066262
§ 371 (c)(1),
(2) Date: May 13, 2014

(87) PCT Pub. No.: WO2013/101370
PCT Pub. Date: Jul. 4, 2013

(65) Prior Publication Data
US 2014/0318530 A1    Oct. 30, 2014

Related U.S. Application Data

(60) Provisional application No. 61/562,823, filed on Nov. 22, 2011.

(51) Int. Cl.
*F28D 20/00* (2006.01)
*F28D 17/04* (2006.01)
(Continued)

(52) U.S. Cl.
CPC .............. *F24J 2/34* (2013.01); *E21F 15/005* (2013.01); *E21F 17/16* (2013.01); *F28D 17/005* (2013.01);
(Continued)

(58) Field of Classification Search
CPC ........ F28D 17/005; E21F 15/005; E21F 17/16
See application file for complete search history.

(56) References Cited

U.S. PATENT DOCUMENTS 3,677,008 A * 7/1972 Koutz ...................... F02C 6/16
                                                              290/52
3,989,927 A * 11/1976 Erb .......................... C09K 5/14
                                                              126/400
(Continued)

FOREIGN PATENT DOCUMENTS

DE        4201580 A1    7/1993
PL     EP 0289717 A2 *  11/1988  .............. F24D 11/02
(Continued)

OTHER PUBLICATIONS

Nelson, Michael G., "Site Environmental Considerations" SME Mining Engineering Handbook (2012) Ch. 16.1, p. 1644.
(Continued)

*Primary Examiner* — John Kreck
*Assistant Examiner* — Michael Goodwin
(74) *Attorney, Agent, or Firm* — Morriss O'Bryant Compagni

(57) ABSTRACT

The present disclosure includes a mining system which comprises ore, waste, and a reservoir which comprises a portion of said waste through which air can flow with low resistance for storing thermal energy from a tempered air source and supplying it to a tempered air consumer, and connections for tempered air flow between said tempered air source and said reservoir and between said tempered air consumer and said reservoir. Note: As used herein, "tempered air" means air of a temperature sufficiently high to heat, or low to cool, an object to a desired temperature. For example, in a house, the furnace is a source of tempered air for heating in winter, the air conditioner a source of tempered air for cooling in summer, and the house is a consumer of tempered air.

22 Claims, 9 Drawing Sheets

(51) Int. Cl.
   F24J 2/34      (2006.01)
   F24J 2/20      (2006.01)
   E21F 15/00     (2006.01)
   E21F 17/16     (2006.01)
   F28D 17/00     (2006.01)

(52) U.S. Cl.
   CPC ........... *F28D 20/0056* (2013.01); *F24J 2/201* (2013.01); *Y02E 60/142* (2013.01)

(56) References Cited

U.S. PATENT DOCUMENTS

| | | | |
|---|---|---|---|
| 4,137,898 A | 2/1979 | Koizumi et al. | |
| 4,139,321 A | 2/1979 | Werner | |
| 4,262,656 A | 4/1981 | Esposito | |
| 4,362,149 A * | 12/1982 | Thomson | F01K 3/00 126/400 |
| 4,505,322 A | 3/1985 | Larson | |
| 6,302,188 B1 * | 10/2001 | Ruhl | F23C 13/08 165/10 |
| 6,705,043 B1 | 3/2004 | Opdam et al. | |
| 7,891,187 B2 | 2/2011 | Mohr | |
| 2005/0150225 A1 | 7/2005 | Gwiazda et al. | |
| 2008/0066736 A1 | 3/2008 | Zhu | |
| 2008/0190813 A1 | 8/2008 | Dana et al. | |
| 2009/0090109 A1 * | 4/2009 | Mills | F24J 3/081 60/659 |
| 2013/0206356 A1 * | 8/2013 | Pedretti | F28D 20/0056 165/10 |

FOREIGN PATENT DOCUMENTS

| | | | | |
|---|---|---|---|---|
| PL | EP 0289718 A2 * | 11/1988 | | F24D 11/02 |
| WO | 2011064749 A2 | 6/2011 | | |
| WO | 2011119409 A2 | 9/2011 | | |

OTHER PUBLICATIONS

Feuilloley, P., "The use of low cost inflatable sky captors in polyethylene film for low temperature air drying" Plasticulture (1980) No. 47, p. 15-25.

"EcoShale Technology Is the Economic and Enviromental Choice." EcoShale Technology. Red Leaf Resources, Inc., Oct. 21, 2011.

* cited by examiner

MINING SYSTEM WITH SUSTAINABLE ENERGY RESERVOIR LEGACY

CROSS-REFERENCE TO RELATED APPLICATION

This application claims the benefit of U.S. Provisional Application No. 61/562,823, filed Nov. 22, 2011, the disclosure of which is incorporated herein by reference in its entirety.

TECHNICAL FIELD

The present disclosure relates to mining systems having a closure legacy that include reservoirs for the storage of sustainable thermal energy.

BACKGROUND

As billions of people around the world climb out of poverty, their need for basic raw materials will require increasing mining activity. Seeking a social license to operate, "leading mining companies have recently formulated, and pledged to follow, standards and principles for sustainable development of mineral resources worldwide" (chapter 16.1, page 1644, "Site Environmental Considerations" by Michael G. Nelson in the SME Mining Engineering Handbook, 2012, the contents of which are incorporated by reference herein in their entirety). To earn such license from the community, mine operators must consider the mine's legacy after closure: How will the environmental legacy look? Will the social and economic legacy be the "boom and bust" of historic mining communities? There is significant need for a mine legacy that is environmentally, economically, and socially beneficial.

The need for low cost sustainable energy is well known. Fortunately there are many sources of economical or even free low-grade thermal energy, such as industrial waste heat, hot summer air, or cold winter air. A challenge is their intermittent production. There is a strong need for economical storage of low-grade thermal energy, so that it can be used whenever needed.

The present disclosure is directed to addressing these needs with a thermal energy reservoir which is a legacy product from a mining system. The reservoir may be constructed in situ from mined waste rock at small cost incremental to ordinary mining activity. It stores low-grade thermal energy when economically available, and supplies thermal energy as needed. For example, free hot summer air can be stored for use in winter as needed.

Most alternative energy endeavors require massive up-front capital investment, governmental incentives, and long payback periods. By focusing on low-grade thermal energy and leveraging mining activity which is proceeding anyway, a small incremental cost enables creation of a large-scale alternative energy system with short payback. More than just environmentally friendly, the legacy reservoir is a valuable asset that gives an on-going vibrant community a competitive edge by supplying sustainable energy at cost well below conventional sources.

Note: As used here, "thermal energy" means a capacity to heat or cool some object to a desired temperature. "Low-grade" means that temperature differences are relatively small, typically less than 100 degrees Celsius, in contrast to "high-grade" thermal energy such as the steam in a power plant which may be at 500 degrees.

SUMMARY

The present disclosure includes a mining system which comprises ore, waste, and a reservoir which comprises a portion of said waste through which air can flow with low resistance for storing thermal energy from a tempered air source and supplying it to a tempered air consumer, and connections for tempered air flow between said tempered air source and said reservoir and between said tempered air consumer and said reservoir.

Note: As used herein, "tempered air" means air of a temperature sufficiently high to heat, or low to cool, an object to a desired temperature. For example, in a house, the furnace is a source of tempered air for heating in winter, the air conditioner a source of tempered air for cooling in summer, and the house is a consumer of tempered air.

The present disclosure further includes systems and methods for constructing the thermal reservoirs, including conveyances for moving a portion of the waste from its original location to a sorter, sorting said waste into coarse and fines, and conveyances for moving the coarse to various locations to construct the reservoir concurrent with operation of the mine to extract ore.

The present disclosure further includes a number of sources of tempered air. In one illustrative embodiment, the source may be a "sky farm". The sky farm economically encloses a volume of air and exposes a large surface area to sky radiation. The sky farm may comprise a tube which encloses a large volume of air, a radiant member with large surface area and high absorptivity for radiation from the sun or high emissivity of radiation to the night sky, an outlet in the tube through which tempered air passes toward the thermal reservoir, and an inlet in the tube through which air passes to replace the tempered air that is sourced to the thermal reservoir. In some illustrative embodiments, the sky farm may act as a water-impermeable means that prevents precipitation from reaching the ground and entering the thermal storage reservoir. In one particular embodiment, the radiant member may be a surface of the tube which is optically exposed to the sky.

Embodiments in accordance with the teachings of the present disclosure may further include tempered air consumers, such as a greenhouse system or a community utility system that utilizes tempered air. In one example, a greenhouse obtains part or all of its thermal energy, used for either heating or cooling, via tempered air from a thermal reservoir in accordance with the present invention. In another example, a tempered air consumer may be a community utility system including a distribution network for providing tempered air to a community of buildings which are tempered air consumers.

In some illustrative embodiments of systems including thermal reservoirs in accordance with the present disclosure, that include at least two ports with significant elevation difference between them, at least one of the ports may have an air flow control gate, so that thermal convection can drive airflow through the reservoir in a controlled manner.

DETAILED DESCRIPTION

It will be appreciated by those skilled in the art that the embodiments herein described, while illustrative, are not intended to so limit the invention or the scope of the appended claims. Those skilled in the art will also understand that various combinations or modifications of the embodiments presented herein can be made without departing from the scope of the present disclosure. All such alternate embodiments are within the scope of the appended claims.

Further, it will be appreciated by those of ordinary skill in the art that the various drawings discussed in this description are for illustrative purposes only. The nature of the present disclosure, as well as other embodiments, may be more clearly understood by reference to the following detailed description, to the appended claims, and to the several drawings.

Figure 1:
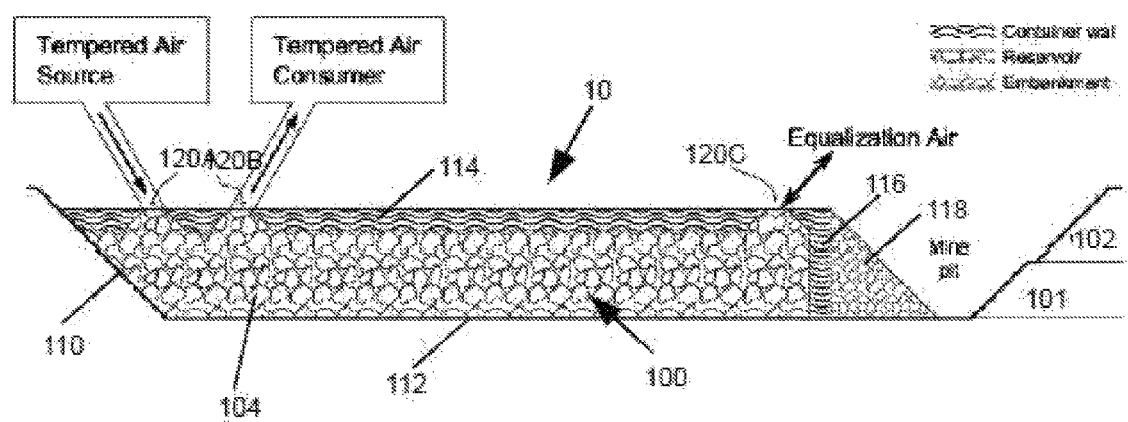
FIG. 1 depicts a first embodiment of a thermal reservoir system in accordance with the principles of the present disclosure.

FIG. 1 summarizes a first illustrative embodiment in accordance with the present disclosure. The mining system 10 typically will comprise ore 101 and waste 102. Ore 101 is geologic material having economic value that is extracted from the earth as a function of the mining system. Examples include metals, hydrocarbons, other chemicals, gemstones, or the like which are present in only a fraction of the ore, or coal or similar materials which constitute the entirety of the ore 101. Waste 102 is rock which must be removed in the process of mining the ore 101. Various systems and methods for mining are well known and can be used as long as sufficient quantities and size distributions of waste are produced as required to construct the reservoir.

Commonly, surface mining (sometimes called strip mining) produces large quantities of waste 102. For example, a layer of waste rock may be 20 meters thick on top of an ore layer 20 meters thick. The waste 102 is fractured, by explosives for example, and moved by shovel, truck, moving belt conveyer, or the like to another location within the mine from which the ore has already been extracted. This exposes the layer of ore 101 for extraction.

Other suitable mining methods may be variants of surface mining such as those proposed for shale oil (for example, US Patent Application Publication number 2008/0190813 to Dana and Patten and associated patents, which is incorporated by reference herein in its entirety, and the EcoShale description online at www.redleafinc.com as of November 2011). In these methods, a permeability control structure is formed which may be within the mine; ore 100 (hydrocarbon-containing shale oil rock) is fractured and moved into the infrastructure; the infrastructure may be covered with waste rock that has been moved from another location within the mine as part of a concurrent reclamation process; and the ore 101 is then heated to temperatures in the range 200 to 900 degrees Fahrenheit to extract hydrocarbon from the ore 101. For purpose of the present invention, this mining method may be used in various ways. In one, the waste rock is formed into a reservoir located above the infrastructure, where waste rock would normally be placed. In other embodiments, the infrastructure may be modified slightly to permit airflow access, the rock within the infrastructure is designated as waste 102 after hydrocarbon has been extracted, and the infrastructure and rock form a reservoir 100.

Alternatively, an open pit or underground or other mining system which produces sufficient quantities and sizes of waste rock may be suitable.

In the depicted embodiment of FIG. 1, there is a reservoir 100 for storing thermal energy. The reservoir 100 comprises waste rocks 104 and air forming voids between the rocks so as to make the reservoir permeable to airflow. Rock size is defined as the diameter of a sphere which has the same volume as the rock. A void fraction is defined as the fraction by volume of air among waste rock 104 in the reservoir 100. In the depicted embodiment, average rock size is about 0.5 meter, void fraction is about 40%, and the reservoir 100 is approximately about 500 meters wide by about 1000 meters long by about 20 meters deep of waste rock. In other embodiments, rock size ranges from 0.1 to 10 meters, void fraction from 20% to 60%, and the reservoir 100 may have various shapes to accommodate topographies of the mine excavation and desired surface after mine land reclamation. Such shapes will generally have volume greater than about 200,000 cubic meters.

The thermal mass of the rocks 104 in the reservoir 100 stores thermal energy. Tempered air flowing through the reservoir 100 transfers its heat (or "coolness") to the rocks 104, causing their temperature to increase (or decrease). After sufficient tempered air flows, the reservoir rocks 104 will attain a "charged temperature". The rocks 104 transfer their heat (or "coolness") to the air when less-tempered air flows, which assumes approximately the rock temperature, and the rock temperature decreases (or increases) slightly. After sufficient less-tempered air flow, the rock 104 reaches a "discharged temperature". One measure of the thermal storage capacity of the reservoir 100 can be calculated as the product of the reservoir mass multiplied by the rock specific heat multiplied by the absolute value of the difference between the charged and discharged temperatures. In one illustrative embodiment, charged temperature is about 50 degrees Celsius, discharged temperature is about 30 degrees Celsius, and thermal storage capacity is approximately 300 teraJoules, i.e., 80 gigaWatt (thermal) hours, an amount of thermal energy generated by approximately $ 2.5 million of natural gas at 2011 average commercial prices.

The reservoir 100 is substantially enclosed by a container having ports 120. The container limits air and heat from easily flowing into or out of the reservoir 100 except via the ports 120. The container is formed by the walls surrounding the reservoir 100. Container walls should be thick enough, considering container materials, to provide significant resistance to the flow of air and heat between the reservoir and the exterior of the container, such that, considering the thermal mass of the reservoir, the thermal energy leakage through container walls is acceptable. The container top, side, and bottom walls may be of similar or differing materials and construction.

In one illustrative embodiment, the reservoir 100 of FIG. 1 has a container in which the bottom and left side walls 110 and 112 are formed from the undisturbed rock of the bottom and left side of a mine excavation. The top wall 114 and other side walls 116 (which may be front, back and right side walls, though only right is illustrated here for clarity) are about 5 meters thick and may be formed from an aggregate of variable sized waste including fines (small-sized down to sand-sized waste rock) that fill voids between larger rocks, thereby making the walls impermeable to airflow relative to the reservoir 100. The right side wall 116 has a supporting embankment 118 of waste or other material. It will be appreciated that the aggregate may be formed of fines from the sorting or may be formed of a mix of fines and raw waste. Where appropriate other materials may be added as well.

The wall cross-section can be a variety of shapes as desired for structural stability, material usage, and so on. In other embodiments, the walls may be comprised of various geologic materials and have thickness greater than about 2 meters. In still other embodiments, some or all walls may be comprised of one or more thermal insulators such as Geo-Foam (expanded polystyrene), diatomite, vermiculite, clay, sand, or such, and have thickness greater than about ½ meter. It will be appreciated that although some depicted embodiments show reservoirs constructed within a mining pit, that in other embodiments, the reservoir may be constructed near the mine rather than in the mining pit to allow for use during mining operations or to facilitate mining depending on the particular location.

One or more ports 120 in the container wall allow air to flow into or out of the reservoir 100. Port 120A in FIG. 1 allows tempered air to flow from a tempered air source into the reservoir, and port 120B allows tempered air to flow from the reservoir to a tempered air consumer. In case of either flow, an equal flow of atmospheric air, indicated as equalization air, flows out of or into, respectively, port 120C to equalize pressure in the reservoir 100. In this illustration, port 120A may also be called a source port, port 120B a consumer port, and port 120C an equalization port. In other embodiments, a single port 120 may be used for both source and consumer air flows and is then both a source port and a consumer port. It is understood that various means may be provided to cause the air to flow and control the amount of flow.

Figure 2:
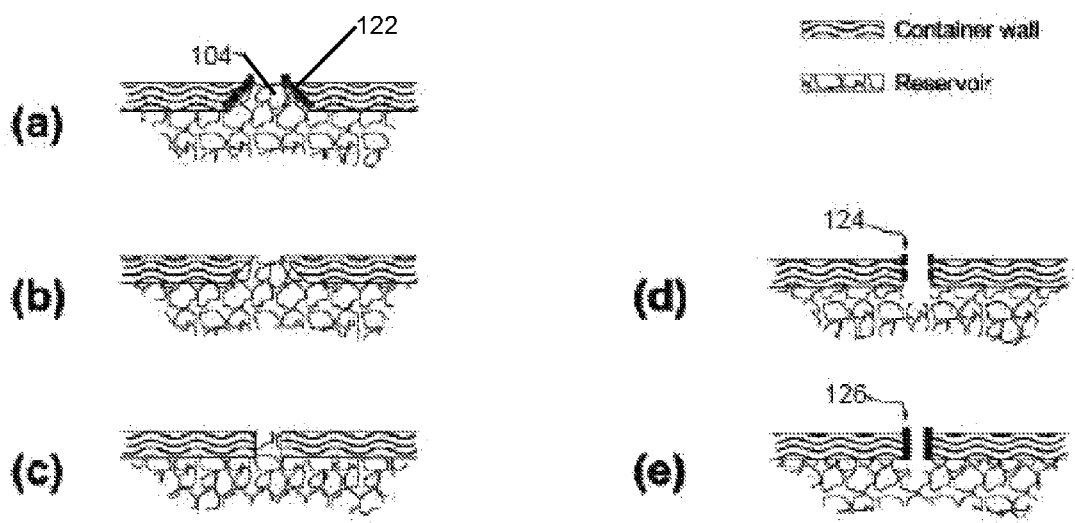
FIG. 2 shows cross sections of the reservoir of FIG. 1, including various port designs for the top container wall thereof.

FIG. 2 shows cross sections of reservoir 100 and top container wall 114 having various port 120 designs. The embodiment of port 120 depicted in FIG. 2a is shaped as a truncated cone filled with reservoir rocks. Diameter of the cone truncation is said to be the port diameter and must be sized large enough to allow a required volume of air to flow with acceptably-low friction loss. Conical shape provides expanding cross-section with increasing depth, to facilitate low-friction flow of air through the port for a given port diameter. The reservoir rocks 104 provide structural support for the container wall surrounding the port. An air-impermeable membrane 122 surrounds the port to prevent air leaking through the container wall which is thin in the port vicinity. The membrane 122 may be plastic sheet, concrete, clay or various other obvious materials. In case a connecting duct carries airflow to the port, for example from a tempered air source, the duct can be seamed to this membrane 122. FIG. 2b shows a similar port embodiment without the membrane, in case the container material is acceptably impermeable to air even in the port vicinity.

In the embodiment shown in FIG. 2c, the port 120 has a cylindrical or rectangular prism shape and is filled with reservoir rocks 104. In the embodiments shown in FIGS. 2d and 2e, the depicted ports 120 contain empty air space and the container wall is supported, for example by wire mesh 124, concrete 126, or other well-known means. An enlarged air space may be provided into the reservoir 100 as shown in FIG. 2d to increase the surface area of the reservoir 100 accessible to airflow, and hence decrease friction loss.

In one illustrative embodiment, the port 120 diameter may be about 5 meters to allow for an airflow of about 20 cubic meters per second. In other embodiments, the diameter may be greater than about 2 meters. For example, in another embodiment the port 120 may be generally rectangular when viewed from above, and may have dimensions of about 5 meter by about 100 meter.

Figure 3:
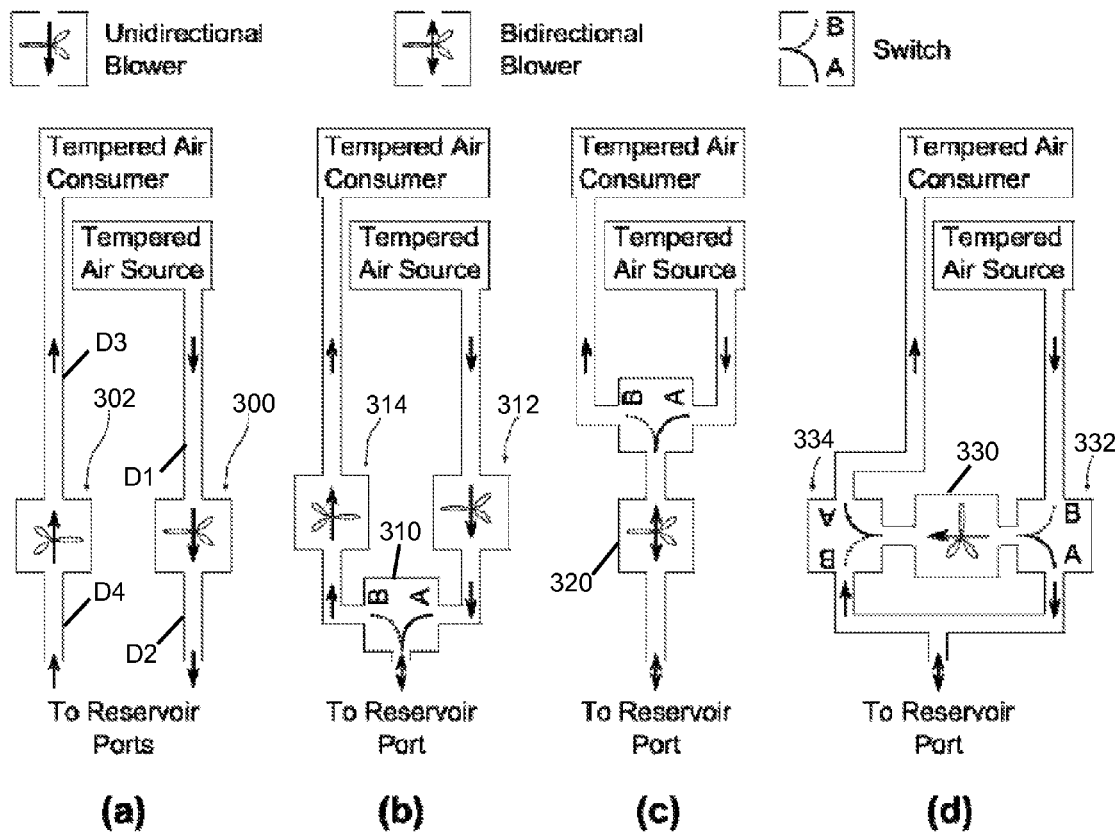
FIG. 3 depicts schematics of various ways that tempered air sources and consumers may be connected to ports of a reservoir in accordance with the present disclosure using ducts, blowers, and switches.

Tempered air sources and consumers may be connected to ports using ducts, blowers, and switches in various ways as shown in schematic form in FIG. 3.

In the embodiment shown in schematic form in FIG. 3a, a duct D1 connects a tempered air source to a unidirectional source blower 300, and another duct D2 connects the blower 300 to a source port into the reservoir 100. The blower 300 pulls air from the tempered source and pushes it into the reservoir 100. Similarly, a unidirectional consumer blower 302, ducts D3 and D4, and port pull air from the reservoir 100 and push it to a tempered air consumer. Generally, the source blower 300 is activated only when the source is producing tempered air, and the consumer blower 302 only when the consumer is consuming tempered air. As previously mentioned, when one of the blowers is activated, an equalization port may admit or release an equal air flow between atmosphere and reservoir, and thus equalize pressure in the reservoir 100. It is assumed that tempered air sources and consumers likewise incorporate means to equalize their pressure with respect to atmosphere when supplying or consuming tempered air.

In some illustrative embodiments, air flow velocity may be about 20 cubic meters per second, and friction losses and hence air pressure differences are on the order of about 1000 Pascals. The ducts may have circular cross sections of about 1.5 meters in diameter and may be constructed of a polyethylene film, such as a 6 mm thick polyethylene film. Design of air ducts is well known in the field of HVAC and industrial process engineering. Ducts may have circular, elliptical, rectangular, or other cross-sectional shapes and be made from a variety of materials.

The blowers overcome friction losses and induce air to flow, and may be implemented by any of many well-known means, including centrifugal blowers or fans. The blowers are provided with means that prevent significant air flow through them when they are not activated.

The source blower 300 may be located near the source and the consumer blower 302 near the reservoir port. This provides positive pressure (above atmosphere) in the ducts to keep them inflated and maintain their shape. In other embodiments, ring stiffeners or other structural elements maintain duct shape even in the face of negative pressure (less than atmosphere), thus allowing the blowers to be located arbitrarily.

There are other suitable configurations connecting ports to sources and consumers. FIG. 3*b* shows use of single port shared between source and consumer by means of a switch 310. The switch 310 is placed in position A when the tempered air source is activated to supply tempered air to the reservoir, and in position B when the tempered air consumer is activated to pull tempered air from the reservoir, while the corresponding blower 312 or 314 is activated in either case.

FIG. 3*c* similarly shows a single port shared between source and consumer which uses a single bidirectional blower 320 activated in the appropriate direction.

In FIG. 3*d*, source and consumer share a single port and single unidirectional blower 330 by means of consumer and source switches 334 and 332. When the source provides tempered air, both switches are set to position B and the blower 330 activated. When the consumer consumes tempered air, both switches are set to position A and the blower 330 activated.

In other embodiments, a blower may be provided within a tempered air source and a corresponding blower as depicted in FIG. 3 may not be needed.

A means for gating air flow on a port, i.e., for controlling the volume of air flow including shutting off flow or allowing it unimpeded may be provided. This function may be provided as a consequence of the blowers and switches just described, or a separate gate may be used. Such a gate may be provided using a large moveable sheet of plastic or similar material which is supported by laying against mesh which is on the down draft side of the plastic. The sheet may be rolled back to allow air flow, and rolled out to restrict air flow.

A water-impermeable means which prevents water of precipitation (e.g., rain, snow, dew, frost) from entering the reservoir and diminishing its thermal energy may also be provided. As depicted in cross section in FIG. 4*a*, such a barrier 400 may be an above-ground structure or set of structures which substantially covers the reservoir area, intercepts precipitation, and channels water to storage or away from the reservoir vicinity. Said structure may have a roof and gutters for intercepting and channeling precipitation, and an interior volume for some other purpose. Design of such structures is well-known in architecture and civil engineering.

Figure 4:
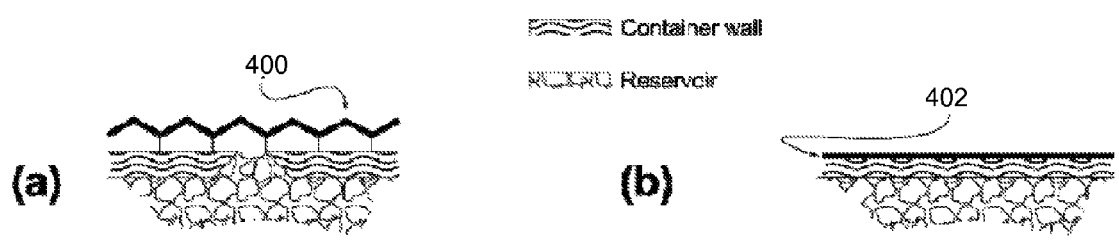
FIG. 4 depicts water-impermeable means which may be used to prevent water of precipitation from entering a reservoir in accordance with the present disclosure.

As depicted in FIG. 4*b*, said water impermeable means may also be one or more layers of impermeable membrane 402 substantially covering the reservoir area. Such membranes may be buried in the ground, placed on the surface or be disposed within the upper portion of the container top wall. Use of such impermeable membranes is well-known in mining engineering for preventing surface water leaching into impounded mine waste.

Figure 5:
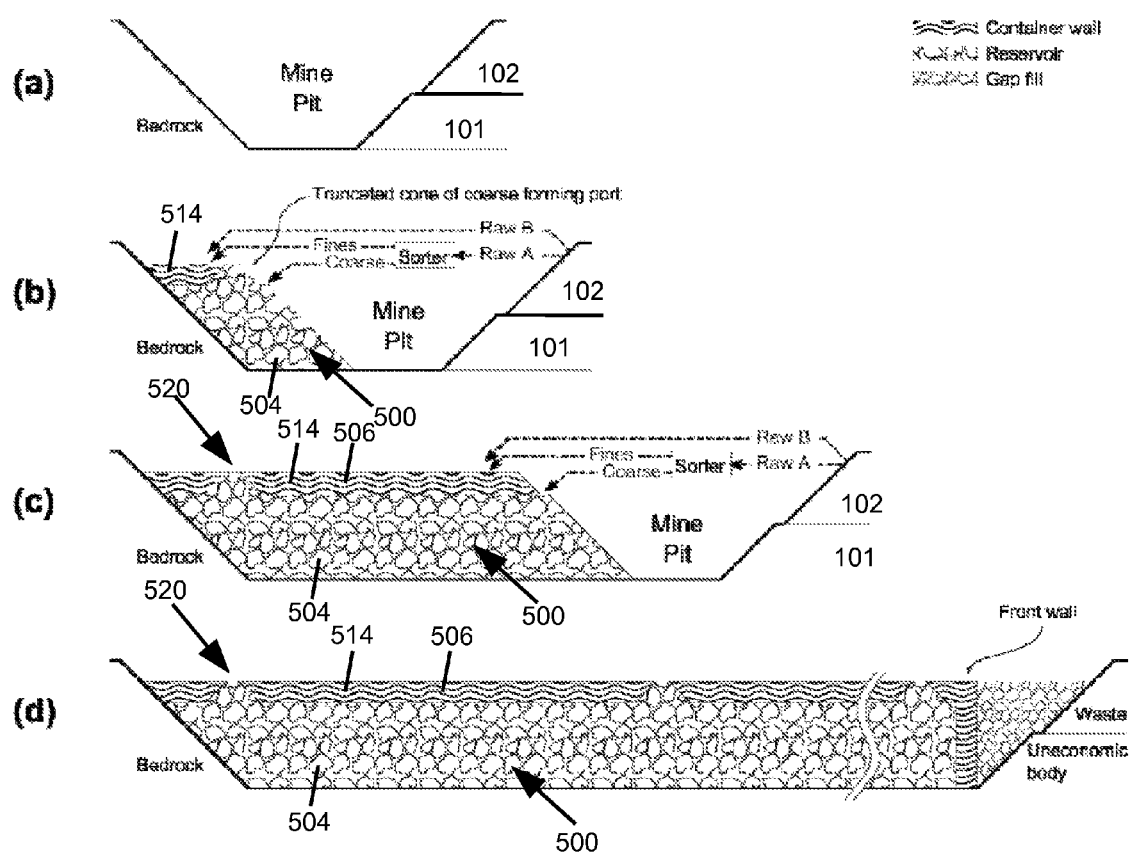
FIG. 5 depicts a series of mine cross-sections illustrating a progression compatible with well-known surface mining methods for constructing reservoirs in accordance with the present disclosure.

Methods for constructing reservoirs in accordance with the present disclosure include those depicted in FIG. 5 which show a series of mine cross-sections illustrating a progression compatible with well-known surface mining methods. During this progression, ore 101 is also extracted by well-known methods not described.

As depicted at FIG. 5*a*, a mine may be opened by conventional means and methods of digging a pit which exposes a face comprising the waste 102 and ore 101. During this process, waste 102 must be stockpiled outside the mine.

As shown in FIG. 5*b*, after a large enough pit has been opened suitable for following operations, conveyances and a sorter are employed to construct a reservoir 500 within the pit. Waste rock 102, which has been broken into pieces and is called "raw", is sorted to isolate those rocks called "coarse", having size greater than a threshold and the remainder called "fines". Coarse 504 is used to fill the reservoir and thus achieve the desired void fraction and permeability to airflow. Fines 506 are deposited as a relatively impermeable aggregate to construct container walls. Where desirable, the fines may be deposited together with raw waste to yield the aggregate. Container walls are constructed concurrently with filling the reservoir 500, minimizing need to stockpile rock of different sizes, and providing support for walls.

Conveyances labeled "Raw A", "Fines", "Coarse", and "Raw B" move waste and comprise one or more of stacker-reclaimers, mechanized shovels, trucks, fixed conveyors, or any of many such well-known rock conveyance means for mining. A stacker-reclaimer is particularly advantageous because it can be controlled to deposit rock in specified amounts and locations to construct a specified three-dimensional structure of rock. Raw is moved by conveyance "Raw A" from its original location to the sorter and by conveyance "Raw B" to various locations where container walls are being constructed. Conveyance "Coarse" moves coarse 504 from the sorter to various locations within the reservoir. Conveyance "Fines" moves fines from the sorter to various locations of the container where walls are being constructed.

The sorter may be any means for sorting rock by size. Many such means are known, for example a steel mesh, or parallel steel bars, having spacing such that fines drop through while coarse rocks are held back and segregated to a different path. The rock size threshold may be larger than about 0.1 meter and preferably larger than about 0.3 meter; therefore such sorting can proceed quickly and economically. In some cases, the fines may be further segregated into additional size ranges as needed for construction of a suitably impermeable aggregate for container walls. The sorter may be located within or outside the pit.

The coarse 504 which is conveyed and deposited to the reservoir will naturally pile up with voids (i.e., air space) between the rocks, as is known in mining. The distribution of rock size among the coarse determines the resulting void fraction in the reservoir. Greater distribution variance gives smaller void fraction; conversely greater uniformity gives greater void fraction. To achieve a desired void fraction, rock size distribution may be adjusted by changing sorter criteria or the method of initially breaking waste into pieces, or a combination thereof. Generally, the exact void fraction is not critical as long as it is greater than the fraction that enables acceptably low friction loss during air flow within the reservoir and the ports.

Raw and fines 506 from conveyances "Raw B" and "Fines" respectively are mixed and deposited substantially simultaneously to form a relatively impermeable aggregate composing container walls. During planning mine operation and reservoir construction in order to use all waste in reservoir construction without excess of one kind or another, the fraction of raw in the container wall, Krc, can be calculated from the following parameters.

Vr Volume of reservoir
Vc Volume of container walls
Kvr Void fraction of reservoir
Kvc Void fraction of container walls
Kfr Mass fraction of fines generated by sorting raw Calculate $Krc = \{Vc - Vr*[(1-Kvr)/(1-Kvc)]*[Kfr/(1-Kfr)]\}/Vc$ Krc should be less than a maximum, Krc(max) which depends on various factors including rock characteristics, size and shape distribution of the fines and raw, and method of aggregating, depositing and compacting them. Krc(max) can be readily determined by experimentation upon the particular methods and waste available. For a typical case, Krc(max) may be about 35%.

If Krc>Krc(max), then there are not enough fines to give acceptably low container wall void fraction and permeability to air flow. Either Vc may be decreased or Vr increased in design, or excess coarse generated and deposited other than in the reservoir.

Preferably, Krc is almost Krc(max). If negative or significantly less, then there are more fines than needed for container walls. Kvc may be decreased, Vc increased, Vr decreased, or excess fines deposited other than in container walls. For example, in some embodiments, the container walls may be constructed entirely from fines without using raw waste.

In one illustrative case,

Vr=1×10^7 cubic meters
Vc=2.51×10^6 cubic meters
Kvr=40%
Kvc=5%
Kfr=22%
resulting in Krc=29.1%.

As seen in FIGS. 5b and 5c, the coarse 504 is deposited at a rate coordinated with, and ahead of, the aggregated fines 506 and raw forming the container top wall 514. The layer of aggregate is then deposited on top of the coarse, thus forming the container top wall.

Although not illustrated for sake of clarity, the container side walls are also being constructed at a coordinated rate. Generally there may be a gap between the outside of the container side wall and the bedrock forming the pit wall, which gap may be filled with raw. The coarse, aggregate, and gap-filling raw are deposited to the reservoir interior, container side wall, and gap-fill, respectively, essentially simultaneously to equal elevation, such that each lies up against the other forming substantially straight vertical container side walls. Alternatively, one could be deposited first, e.g., the coarse, which would assume an angle of repose typically in the range 40 to 45 degrees. Then aggregate could be deposited, assuming a similar angle of repose, forming a container side wall slanted at the angle of repose toward the interior of the reservoir. Finally raw could be deposited to fill the gap. In another example, gap-filling raw could be deposited first, then container wall aggregate, and finally reservoir interior coarse, forming a container side wall slanted away from the reservoir interior. In another variation the mine pit side wall is utilized as a container side wall.

FIG. 5b also shows a port 520 being constructed. Coarse has been deposited over the port region to an elevation equal to the container top wall top surface. The coarse has assumed an angle of repose having a truncated triangular cross section in this side view. Where the port is circular, this truncated shape may define a cone. Then aggregate is deposited forming the container top wall. In FIG. 5b the aggregate has been deposited to the left of the truncated triangular cross section, and in FIG. 5c all around the truncated triangular cross section. Although not illustrated, preferably a moderate amount such as 1 meter of aggregate is laid down over the coarse side of the truncated triangular cross section, which assumes a similar angle of repose. Then an air-impermeable membrane is laid down over moderate amount of aggregate, and then the remainder of aggregate is deposited. This process minimizes membrane punctures due to sharp coarse rock corners.

FIG. 5c shows the construction mode as the mine is worked in the direction toward the right edge of the illustration. As the mine face works toward the right, the reservoir 500 and container top and side walls are concurrently constructed toward the right in coordinated fashion as just described. Additional ports may be constructed as needed.

FIG. 5d shows completion of reservoir 500 construction, including a container front wall. When the right edge of the reservoir is attained, the container front wall is constructed simultaneously with reservoir coarse rocks and embankment-filling raw in a manner analogous to that just described for side walls. The last portion of construction may require utilizing material which has been stockpiled outside the mine.

Completion of reservoir construction places that area of the mine in an essentially remediated state with respect to topography. In this way, the reservoir 500 and mine remediation may be both completed soon after the mine is closed.

The material transport rate and destination of each conveyance are preferably managed so that container walls are constructed and the reservoir 500 is filled in a sequence that deposits raw, coarse and fines at rates substantially consistent with their production, to minimize need for stockpiling. Further, the sequence preferably is compatible with progression of ore extraction activities.

In alternate embodiments, the progression illustrated in FIG. 5 may be performed for each of multiple sections of the mine. In such embodiments, one reservoir is completed as each section of the mine is worked, resulting in multiple reservoirs, some of which may be operational while the rest of the mine is still being worked.

The present disclosure further includes sources of tempered air for use with the thermal reservoir. In some embodiments a sky farm may be utilized as a source of tempered air. The sky farm may economically enclose a volume of air and exposes a large surface area to sky radiation. The sky farm may comprise tubing which encloses a large volume of air, a radiant member with large surface area and high absorptivity for radiation from the sun or high emissivity of radiation to the night sky, an outlet in the tube through which tempered air passes toward the thermal reservoir, and an inlet in the tube through which air passes to replace the tempered air that is sourced to the thermal reservoir. In some embodiments, the sky farm may act as a water-impermeable means that prevents precipitation from reaching the ground and entering the thermal storage reservoir. In one illustrative embodiment, the radiant member may be a surface of the tube which is optically exposed to the sky.

It will be appreciated that the term "sky radiation" as used herein is used in a broad sense, meaning in some embodiments the absorption of light and infrared radiation from the sun during daytime which produces hot tempered air, and meaning in other embodiments the emission of infrared radiation to the night sky which produces cool tempered air. In some embodiments, the same sky farm may perform both functions.

Figure 6:
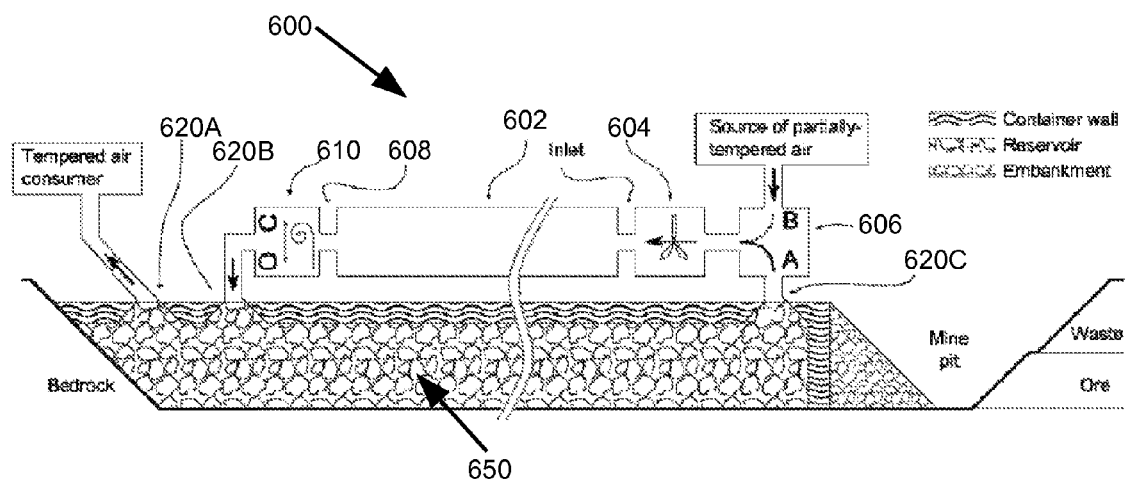
FIG. 6 illustrates one embodiment of a system including a reservoir and a sky farm which serves as a source of hot tempered air.

FIG. 6 illustrates one embodiment in which a sky farm 600 is a source of hot tempered air. The sky farm 600 may comprise one or more tubes 602 each having axial inlet and outlet. In one embodiment, the tubes 602 may have a diameter of about 1.9 meter, and a length of about 340 meter. The tube 602 may be constructed of suitable material, such as a polyethylene film. One such acceptable material is a 150 micron (6 mil) thick black polyethylene plastic film. The black plastic film may also function as a radiant member absorbing sunlight. Sunlight has a typical intensity of about 1,400 Watts per square meter upon a surface normal to the solar direction, ignoring atmospheric attenuation. A portion of this energy is absorbed by the radiant member, which then becomes warmer, transfers this heat energy to the air interior to the tube, elevating its temperature.

In "The use of low cost inflatable sky captors in polyethylene film for low temperature air drying", Feuilloley, P., Plasticulture 1980 No. 47 pp. 15-25 (the contents of which are incorporated by reference herein in its entirety), a single tube of such dimensions was found to harvest on average 132 kw of solar radiation, thereby heating 10 cubic meters per second of air approximately 10 degrees Celsius. Thus a tube 602 may generate about $10,000 per year of thermal energy while the cost for the blower and polyethylene tube is less than $3,000, assuming 2011 costs for natural gas (commercial), $0.12/square foot for 6 mil polyethylene film, and an average operating duty cycle of 30% of each day year-around.

The sky farm may further comprise a blower 604, in the depicted embodiment, the blower may be a 2 horsepower fan, rated for 10 cubic meters per second (22,000 CFM), at the inlet of the tube. In one configuration, the blower 604 receives air from an equalization port 620C of the thermal storage reservoir 650. Alternatively, it may receive air from another source of partially-temperate air, such as atmospheric air or exhaust from a tempered air consumer. Or, a switch 606 as shown in FIG. 6, constructed for example from large moveable sheets of plastic, selects the source of this air to be either the reservoir equalization port (position A), or another source of partially temperate air (position B). Whichever one has the greatest thermal energy can be used, so that the thermal energy produced by the sky farm is optimized.

The tube outlet 608 is connected to a gate 610, which may be a moveable plastic sheet that can either block the flow of air (closed), or permit air to flow (open). The gate 610 is connected to a reservoir source port 620B. During insufficient sunlight, the gate 610 is closed and the blower may run at low speed or intermittently to provide inflation pressure for the tube to maintain its shape. Alternatively, a different specialized low-flow blower can be activated then. When sunlight heats air inside the tube 602 sufficiently, the gate 610 is opened and the blower 604 brings air into the tube, forcing heated tempered air through the outlet 608, the gate 610, and a source port 620B in the container wall, into the thermal reservoir 650. Blower operation in this case will also generate positive pressure inside the tube to keep it inflated.

In some embodiments, a control system controls air flow through the tube 602, by controlling blower speed or gate opening, in response to air temperatures within the tube 602 and reservoir 650, such that temperature of the air exiting the tube 602 is properly tempered. That is, the air has a temperature more-tempered than the reservoir 650 it is about to enter, and not so highly-tempered that thermal leakage to the atmosphere reduces sky farm energy production excessively. When creating heated tempered air, an exit temperature which is 10 degrees Celsius above the reservoir temperature and limited to a charged temperature of 50 degrees Celsius, is preferred. The limit minimizes thermal leakage and softening of the plastic films.

In another embodiment, the sky farm may be a source of cool tempered air. Objects around 10 degrees Celsius radiate about 350 Watts per square meter of surface, according to the well-known Stefan-Boltzmann law. This up-going radiation is balanced by down-welling radiation from the sky which depends on sky conditions including cloud cover, relative humidity, and air temperature. Generally during night, the balance of these two effects leaves a net positive up-going radiation greater than about 10 watts per square meter to above 100 watts per square meter for clear cold desert nights.

Such up-going radiation represents a "cooling" thermal energy which can be imparted to a radiant member in the above-mentioned sky farm tube 602, and hence to the airflow through the tube. Thus ideal "cooling power" ranges from about 6 kilowatts to above 60 kilowatts. This ideal value is reduced by thermal leakage to ambient air which depends on insulation and weather conditions. The sky farm is constructed as described above, except the gate 610 is opened and blower 604 fully activated only during nights when net radiation to the sky is sufficient.

Figure 7:
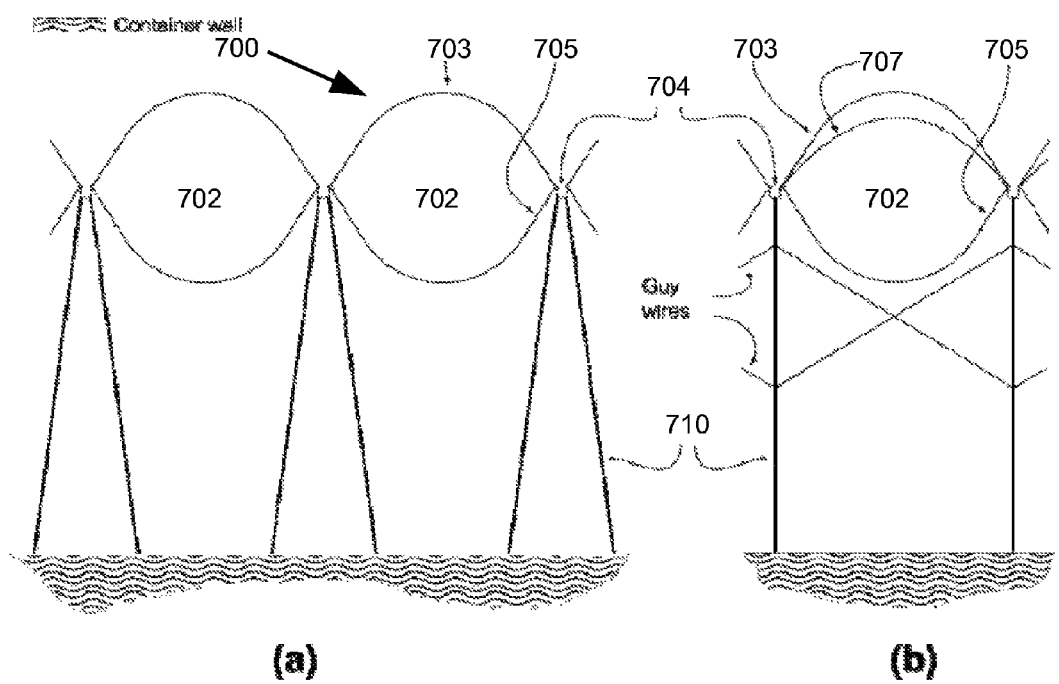
FIG. 7 illustrates partial cross-sections of a sky farm.

FIG. 7 illustrates partial cross-sections of a sky farm 700 comprising tubes 702 of plastic films, gutters, and support structures. One or more of the films may be a radiant member. Multiple tubes 702 are side by side with gutters 704 between, which acts as a water-impermeable means that prevents precipitation from reaching the ground and entering the thermal storage reservoir. FIG. 7a shows two tubes 702 (and partial adjoining tubes), each comprising an upper skin 703 and a lower skin 705. The upper skin 703 may be the radiant member and the lower skin 705 may be any color, or the upper skin 703 may be transparent while the lower skin 705 is the radiant member. FIG. 7b shows an alternate embodiment which has a transparent upper skin 703, separated by air pillows, "bubble wrap", or a positive pressure air space from the radiant member 707, and a lower skin 705. The radiant member 707 and lower 705 skin form the tube within which tempered air is generated. The region between the upper skin 703 and radiant member 707 provides thermal insulation, reducing loss of thermal energy from the tube 700 to atmospheric air. In other embodiments, insulation may also be provided below the lower skin 705, or the lower skin 705 may be made of bubble-wrap plastic which is itself insulating. Since it is protected from damaging UV radiation and the environment by the radiant member and upper skin, the lower skin may be relatively less thick, less durable, and less expensive.

The gutters 704 may resemble common residential roof gutters and are described further below. The skins are secured to the inside of the gutters so that water falling on the upper skin is completely routed into gutters with insignificant leaking. The center-center spacing of gutters is preferably about 2 meters.

The skins and radiant member are of economical plastic film, which may be 150 micron (6 mil) thick polyethylene. The radiant member 707 may be black or other color which has high absorptivity for radiation from the sun or high emissivity of radiation to the night sky. Alternatively the radiant member 707 may be an array of PV (photovoltaic) solar cells for also generating electricity. The length of the plastic film skins is substantially the same as the tube, and the width is sufficient to form the cross section shape shown plus some extra for securing to the gutter. Preferably the length is 340 meters and width 2.8 meter, forming under inflation pressure tube 2 meters high.

Supports 710 elevate the gutters, and hence the tubes above the ground, which is the top surface of the container top wall. Exemplary supports are illustrated in FIG. 7 and well-known alternatives are also suitable. The elevation is preferably high enough that people or machinery can easily move underneath and generally high enough that the lower skin does not contact the ground causing wear or puncture.

Otherwise the lower skin must be of a sufficiently durable material or a protective material placed between it and the ground.

Figure 8:
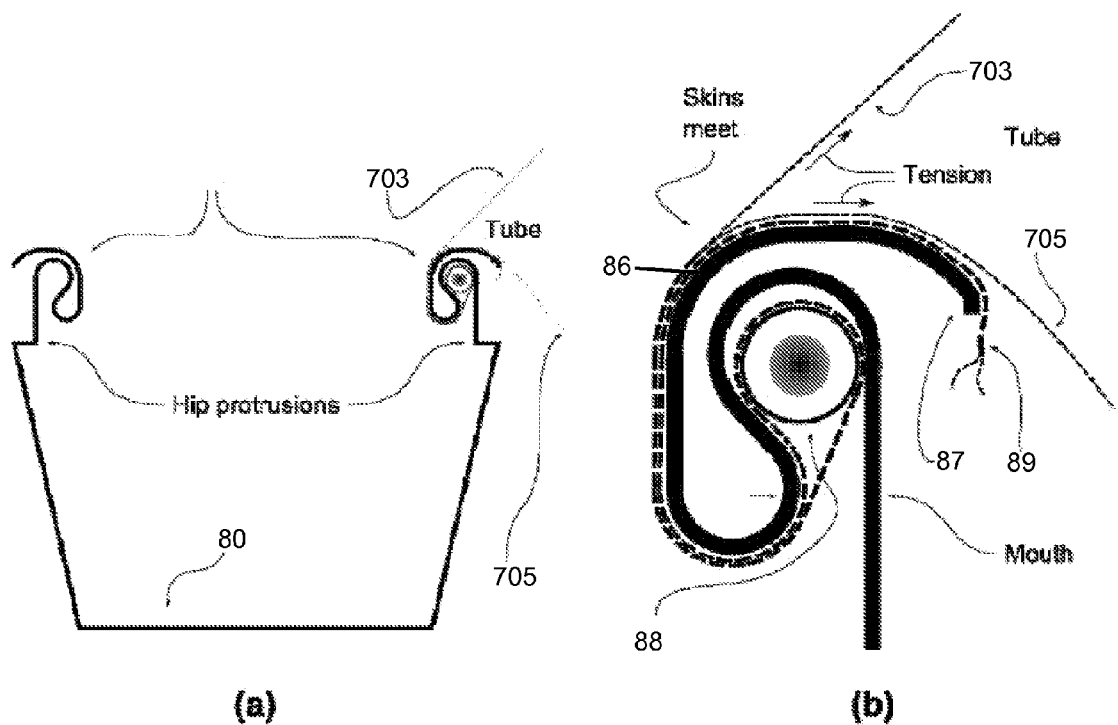
FIG. 8 shows in cross-section some components of a tube for a sky farm.

FIG. 8 shows in cross-section a gutter 80, plastic film upper and lower skins 703 and 705, and retainer 88. The gutter may be metal, for example approximately 0.8 mm (0.032 inch) thick aluminum, formed from a bulk coil of width 380 mm (15 inch) to have the shape substantially as shown, approximately 100 mm wide by 90 mm high, using common residential roof gutter fabrication methods. The gutter bottom is resting upon supports, preventing downward motion. "Hip" protrusions on the gutter sides may engage with sprung elements in the supports to secure the gutter against upward forces, for example due to wind-induced Bernoulli effects on the upper skin or buoyancy of hot air within the tube. With this design, no leak-susceptible penetration of the gutter by fasteners is needed.

FIG. 8b is an enlargement of the gutter shoulder 86 to illustrate one design which secures the skins 703 and 705 to the inside of the gutters. This design allows the film to be secured, removed, or replaced by workers located below the lower skin, who do not have access to the top side of the film or gutter. These operations can be performed when inflation pressure is removed from the tubes and the skins hang limp.

Upper and lower skins route as follows, starting from the right edge of the figure where the skins are enclosing air as a tube and moving toward the left. The skins meet (though need not be adhered) in the vicinity indicated and lay against each other thereafter. From that meeting place, the skins proceed counterclockwise around the gutter shoulder 86, in through the gutter mouth region, counterclockwise around a retainer 88, back out through the mouth region, clockwise around the shoulder sandwiched between the incoming skins and the shoulder, and terminating in a film tail 89. The film tail is where the plastic film skins end, i.e., where the skins' edges are, and the two skins are shown dangling separately.

The retainer 88 may be a foam cord of plastic, rubber, silicone, or like partially flexible material, of solid or tubular cross section. Tubular cross section is advantageous for beginning removal of the retainer using a hook which engages the tube interior.

During operation, the upper and lower skins 703 and 705 are under tension as shown due to inflation pressure within the tube. Such pressure and resulting tension are preferably on the order of 100 to 1000 Pascal and 100 to 1000 Newton per lineal meter of tube. Skin tension pulls the retainer in the downward direction and it jams in the mouth, preventing slippage of the skins.

The gutter mouth opening should be sized so that a worker can press the retainer and plastic film into place, or he can remove it, yet the retainer will not come out under tension from the film. The mouth dimension can be determined from experimentation, and generally depends on stiffness of the gutter metal, firmness of the retainer, gutter shape, film tension, and so on. One exemplary mouth opening may be about 3 mm for use with a retainer of about 6 mm diameter.

The gutter tail 87, corresponding to the edge of the metal coil material, is bent downwards preventing the lower skin from contacting the possibly sharp metal edge. The gutter shoulder region has a smooth curvature which evenly bears the force from film tension. The curvature may be approximately 8 mm radius and need not have constant radius.

Although not illustrated, downspouts may be provided along the gutter to conduct water to aqueducts nearer the ground, via which the water is routed to storage or outside the reservoir region. Considering maximum expected precipitation rate over the area of sky farm skin draining to the gutter, gutter cross-sectional area, and downspout spacing, the gutter slopes at a grade such that flowing water will rise to only a safe level within the gutter. Gutters and supports must be designed to be strong enough to support the weight of this maximum level of water, as well as the gutters and other sky farm materials, and wind and snow load. Supports should further provide structural reinforcement of gutters in the lateral direction, preventing the two shoulders of a gutter from moving apart under tension from the skins.

Other embodiments may use systems for gutters and securing film inside gutters that are known to the field of gutter-connected greenhouses.

Other embodiments may comprise a tempered air source which is one of the following or the like: the warm atmospheric air of summer days, the cool atmospheric air of winter or of night, or air warmed by waste heat from industrial or like processes.

Systems and methods in accordance with the teachings of the present disclosure may include tempered air consumers which utilize tempered air from reservoirs in accordance with the present invention. In one illustrative embodiment, a greenhouse which is a tempered air consumer and obtains part or all of its thermal energy, used for either heating or cooling, via tempered air from a thermal reservoir may be included. This provides significant benefits since heating and cooling are presently a significant portion of a greenhouse's operating expense. In some embodiments, the greenhouse may act as a water-impermeable means that prevents precipitation from reaching the ground and entering the thermal storage reservoir, thus enhancing effectiveness of the thermal reservoir.

Figure 9:
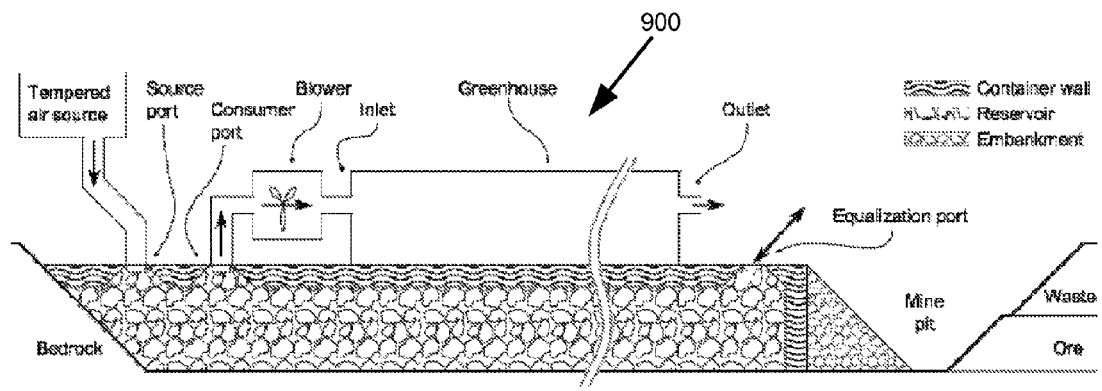
FIG. 9 illustrates one embodiment in which a tempered air consumer is a greenhouse.

FIG. 9 illustrates a thermal reservoir system 900 in which a tempered air consumer is a greenhouse. The greenhouse may be any of the well-known styles, and has an inlet and outlet via which air flows through the greenhouse. A blower draws tempered air from the thermal reservoir consumer port and pushes it through the inlet and through the greenhouse as needed to warm the greenhouse. Additional fans and/or ducts within the greenhouse may be used to evenly distribute the tempered air flow evenly within the greenhouse, as is well known to the HVAC (Heating Ventilation Air-Conditioning) industry. Control of the blower can be on/off per a simple thermostat, or it can be proportional (i.e., variable-speed), or any of the techniques known for HVAC blower control.

In one embodiment, the greenhouse may be about 33 meters wide by about 100 meters long, and occupy about ⅓ of the surface area of a 100 meter by 100 meter section of thermal storage reservoir. The remaining ⅔ area may be covered with a sky farm which is a source of warm tempered air, though other tempered air sources could be used. The sky farm inlet accepts air from the reservoir equalization port, increases the air temperature by 10 degrees Celsius using solar heating, and blows the air via the sky farm outlet into the reservoir via a source port. The source port is located near the reservoir consumer port, or both source and consumer share the same port as described elsewhere. The greenhouse and sky farm together intercept all precipitation, preventing it from reaching the reservoir.

The greenhouse may be regulated to a desired daytime temperature and a desired nighttime temperature. For example it may be regulated to temperatures of about 24 degrees Celsius during day and about 18 degrees Celsius during night. The amount of heat needed to maintain these temperatures will depend on the climate at the installed location. The embodiment described here is calculated for the cool dry climate of Delta, Utah, USA, at latitude of 40 degrees, having average maximum/minimum temperatures of 34/14 degrees Celsius during July and 4/−10 degrees Celsius during January. Table 1 gives simulation results for this embodiment and climate on a monthly basis which show that the sky farm and thermal reservoir acting in concert are able to keep the greenhouse warm as required throughout winter.

Such ventilation adds a significant greenhouse heating requirement because the climate is rather cool during many months, and the ventilation air cools the greenhouse.

Although not shown in Table 1, this simulation further indicates that, assuming 100 HA of land is covered 33% by greenhouse and 67% by sky farm, the alternative of heating

TABLE 1

Simulation result of greenhouse, sky farm, and reservoir for Delta, Utah, USA climate (Note thermal energy to the greenhouse from the reservoir is MJ per square meter of greenhouse area per month)

|  |  | April | May | June | July | August | September | October |
|---|---|---|---|---|---|---|---|---|
| Weather |  |  |  |  |  |  |  |  |
| Average Max. Temperature (F.) | deg F. | 64.1 | 74.4 | 84.9 | 93.9 | 91.6 | 81.5 | 67.9 |
| Average Min. Temperature (F.) | deg F. | 33.0 | 41.6 | 49.3 | 57.4 | 55.7 | 45.6 | 34.4 |
| avg max temp | deg C. | 17.8 | 23.6 | 29.4 | 34.4 | 33.1 | 27.5 | 19.9 |
| avg min temp | deg C. | 0.6 | 5.3 | 9.6 | 14.1 | 13.2 | 7.6 | 1.3 |
| humidity (absolute) | g/m3 | 5.3 | 5.8 | 6.0 | 5.8 | 5.3 | 4.5 | 3.8 |
| Operation highlights |  |  |  |  |  |  |  |  |
| Greenhouse temperature | 23.9 day deg C. |  |  |  |  |  |  |  |
|  | 17.8 night deg C. |  |  |  |  |  |  |  |
| Reservoir s/c port temperature, beginning of month | deg C. | 30.0 | 40.1 | 50.0 | 50.0 | 50.0 | 50.0 | 50.0 |
| airflow to GH (greenhouse) over night hours | m3/s | 19.8 | 8.5 | 4.5 | 2.9 | 3.3 | 5.1 | 7.2 |
| airflow through Sky Farm over day hours | m3/s | 6.6 | 6.4 | 5.8 | 6.3 | 5.2 | 3.4 | 1.8 |
| thermal energy to GH nighttime from reservoir, month | MJ | 102 | 72 | 52 | 36 | 44 | 80 | 126 |
| thermal energy to GH daytime from reservoir, month | MJ | 0 | 0 | 0 | 0 | 0 | 0 | 0 |

|  |  | Winter Months | | | | |
|---|---|---|---|---|---|---|
|  |  | November | December | January | February | March |
| Weather |  |  |  |  |  |  |
| Average Max. Temperature (F.) | deg F. | 51.0 | 40.3 | 38.6 | 45.3 | 54.9 |
| Average Min. Temperature (F.) | deg F. | 23.0 | 15.5 | 13.8 | 19.3 | 25.9 |
| avg max temp | deg C. | 10.6 | 4.6 | 3.7 | 7.4 | 12.7 |
| avg min temp | deg C. | −5.0 | −9.2 | −10.1 | −7.1 | −3.4 |
| humidity (absolute) | g/m3 | 3.2 | 3.0 | 3.2 | 3.8 | 4.5 |
| Operation highlights |  |  |  |  |  |  |
| Greenhouse temperature | 23.9 day deg C. |  |  |  |  |  |
|  | 17.8 night deg C. |  |  |  |  |  |
| Reservoir s/c port temperature, beginning of month | deg C. | 50.0 | 47.1 | 41.6 | 36.2 | 33.7 |
| airflow to GH (greenhouse) over night hours | m3/s | 9.4 | 11.9 | 15.0 | 17.7 | 17.8 |
| airflow through Sky Farm over day hours | m3/s | 0.7 | 0.4 | 0.7 | 2.0 | 3.8 |
| thermal energy to GH nighttime from reservoir, month | MJ | 177 | 209 | 209 | 175 | 137 |
| thermal energy to GH daytime from reservoir, month | MJ | 38 | 51 | 53 | 46 | 28 |

In this simulation, during March through September, the sky farm harvests significant solar energy as indicated by the relatively high airflow, above 3 cubic meters per second. This adds thermal energy to the reservoir and increases reservoir temperature from a discharged temperature of 30 degrees Celsius at the beginning of April to the charged temperature of 50 degrees Celsius by June. Sky farm energy contribution is limited by its control system after the charged temperature is attained. During all months, the reservoir provides tempered air to heat the greenhouse during nights. During winter months, tempered air heating is also provided during days and an increased amount during nights. This increased demand is greater than the reduced supply from the sky farm, which draws down reservoir temperature during winter months to almost a discharged temperature of 30 degrees Celsius by the beginning of March. Then reservoir temperatures increase as the cycle repeats.

The simulation models the ventilation required to remove excess humidity from the greenhouse using atmospheric air. the greenhouse using natural gas would consume about 1,000 teraJoules of non-renewable energy and cost approximately $5 million annually.

Figure 10:
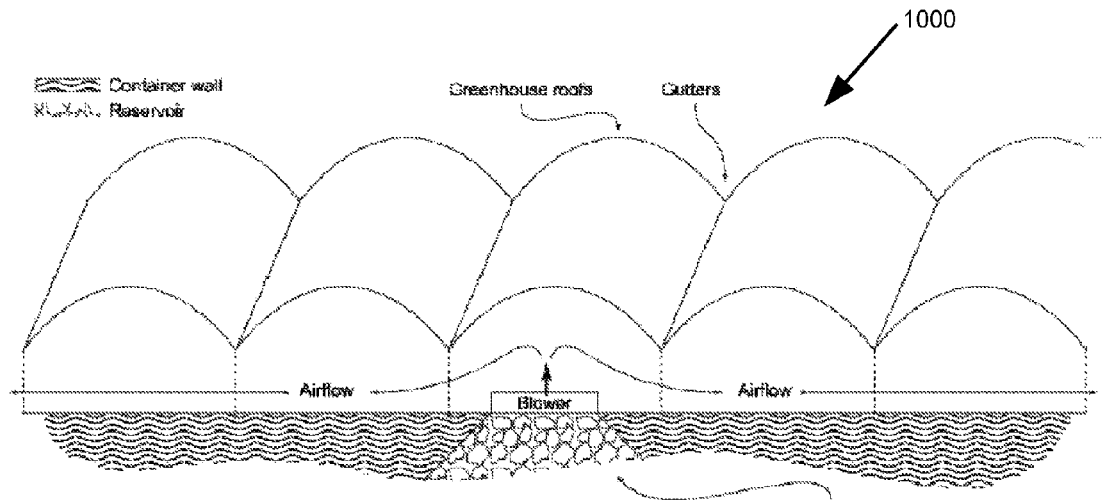
FIG. 10 is a cross section oblique view of a gutter connected greenhouse upon a reservoir container top wall, with port and blower located interior to the greenhouse.

FIG. 10 is a cross section oblique view of a gutter connected greenhouse 1000 upon a reservoir container top wall, with port and blower located interior to the greenhouse. A large expanse covered by greenhouse may have multiple such ports and blowers located throughout. Additional ducting within the greenhouse may be used to evenly distribute the airflow. The greenhouse also includes outlets (not pictured) through which air exhausts to equalize pressure in the greenhouse.

Figure 11:
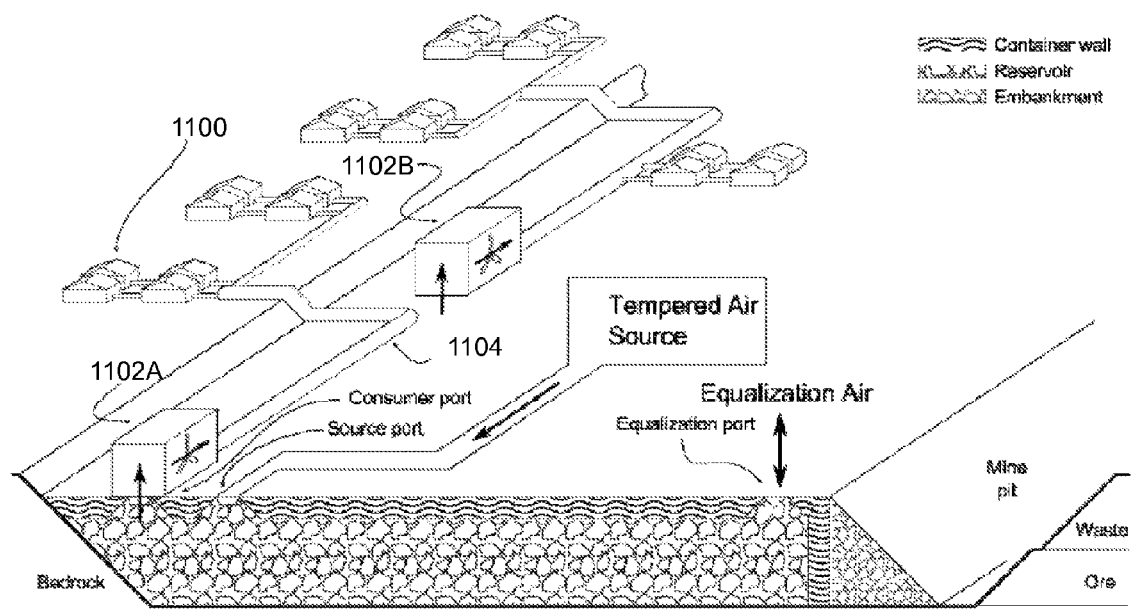
FIG. 11 is a cross section oblique view illustrating a community utility system having a distribution network comprising blower houses and distribution pipes.

In another illustrative embodiment of a tempered air consumer, the consumer may be a community utility system including a distribution network for providing tempered air to a community of buildings 1100 which are tempered air consumers. FIG. 11 is a cross section oblique view illustrating a community utility system having a distribution network comprising blower houses and distribution pipes.

Blower houses 1102 connect to consumer ports of the reservoir, from which they draw tempered air. The illustration shows two blower houses 1102A and 1102B, each connected to an associated port. Alternatively, the number of houses could be one or more, and each could draw air from one or more ports. In the depicted embodiment, each port is about 5 meters in diameter and supports airflow up to about 20 cubic meters per second. A blower house contains an air blower or fan to draw air from a port and push it through a connected distribution pipe. The blower is sized for the airflow and friction loss of the distribution pipe, reservoir, and port. In the depicted embodiment, the friction loss may be about 1000 Pascals.

The blower house 1102 is connected to a distribution pipe 1104 through which the tempered air flows to buildings 1100 where it is consumed. The pipe is organized as a "tree", fanning out to branches and ultimately to each building, similar to a city distribution network of gas or water lines. Each section of the pipe is sized according to the amount of air flow through it, considering length and holding friction loss to levels requiring acceptable blower power. In the depicted embodiment, the largest "main" pipe may be about 100 meters long and about 1.5 meters in diameter. It may be covered with about 2 to about 5 centimeters of insulation such as glass wool or bubble wrap plastic to reduce energy loss through the pipe walls.

In alternative embodiments, a blower house 1102 may draw air from 10 ports of about 5 meter diameter, or from one larger port of about 20 meter diameter, or another appropriately sized combination of ports, having airflow of about 200 cubic meters per second. The "main" section of the distribution pipe may be about 1 kilometer long and about 5 meter diameter with about 5 to about 10 centimeters of insulation.

The community served by this utility can be located upon the reservoir, or off to the side, or a combination of both.

Other embodiments may comprise a consumer of tempered air which is one of following: drying of agricultural products, paper, lumber, grasses, sewage, or other materials; or any process which requires low grade heat.

Figure 12:
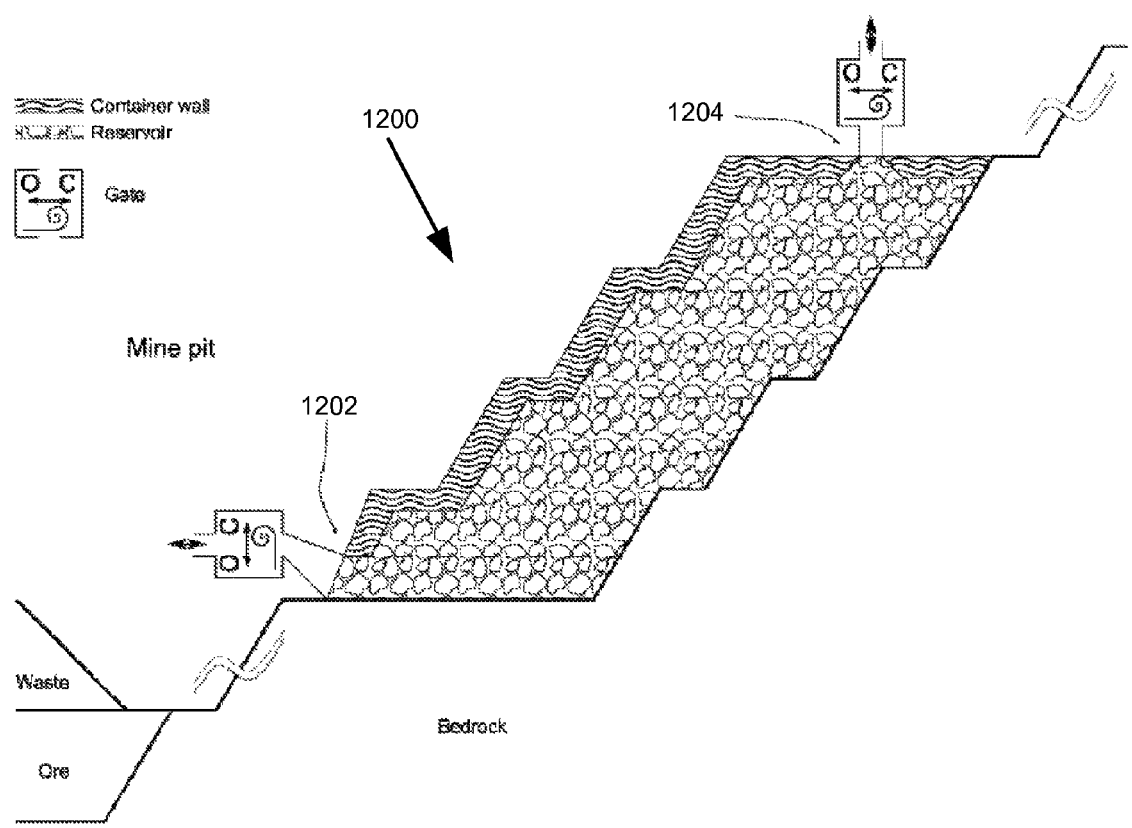
FIG. 12 shows an embodiment in which a thermal reservoir has a significant vertical component.

It will be appreciated that in some embodiments of the present invention, where a thermal storage reservoir has at least two ports with significant elevation difference between them, at least one of the ports may have an air flow control gate, so that thermal convection can drive airflow through the reservoir in a controlled manner. For example, FIG. 12 shows an embodiment in which the reservoir 1200 has significant vertical component, located for example along all or a portion of the side wall of an open pit style mine. There are two ports 1202 and 1204, one 1202 substantially at the lowest elevation of the reservoir and the other 1204 at the substantially highest elevation. Each port is shown connected to a gate which controls the flow of air through the port. The gate may be of the type described elsewhere. In alternative embodiments, one or more ports have such a gate.

One purpose of this system is to use convection to drive airflow through the reservoir without need for blowers. Convection is the well-known effect that "hot air rises, cool air sinks".

Various modes of operating such a system are possible depending on application. One example application is clearing smog from deep pit mines in the subarctic. Due to high latitude and depth of the pit, during winter months essentially no sunlight reaches inside the pit to warm it. Consequently a temperature inversion builds in the air, meaning colder air at lower elevations with warmer air above, thus trapping particulates and pollution in the pit. This poses a health hazard for workers and often forces suspension of operation.

The embodiment depicted in FIG. 12 can be used to warm this cold and polluted air from the lower elevations, and lift it by convection above the inversion level so that it can dissipate. During warm days such as occur in summer or fall, the gates are opened and the reservoir is warmed. During winter days when the temperature is inverted, the gates are also opened. The hot air in the reservoir rises through the upper port, drawing cool air in through the lower port, which is warmed by the reservoir and continues to flow out through the upper port. This warms the cool air and lifts it to the elevation of the upper port. Additional large-scale ducting may be required to convey the air from the upper port to a location outside the pit wall, so that it will not fall back into the pit.

In one example, for a pit mine that is approximately a one kilometer cylinder 300 meters deep, the reservoir may be about 50 meters wide, about 100 meters long, and about 120 meters deep. This stores enough thermal energy to warm about 25 pit-volumes of air by 5 degrees Celsius. That means, all air in the pit could be completely refreshed for each of about 25 temperature inversion times during a winter, which otherwise could force mining operation suspension.

Figure 13:
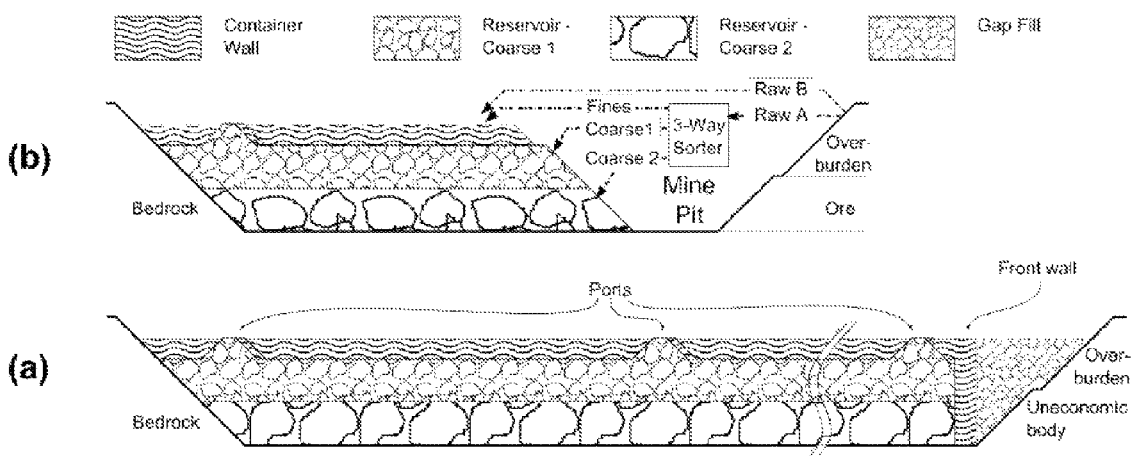
FIG. 13 illustrates another embodiment of a reservoir and potential construction thereof which includes multiple grades of coarse rock layered in the reservoir.

In another embodiment illustrated in FIG. 13a, there are multiple grades of coarse rock layered in the reservoir. For example, one layer indicated as being "Coarse 1" rock (indicated in FIG. 13b) may have average rock size of about 0.2 meter, and another layer indicated as being "Coarse 2" (indicated in FIG. 13b) may have average rock size of about 0.5 meter. In this embodiment, the Coarse 1 layer is above the Coarse 2 layer. In other embodiments, the average rock size may be different, there may be additional layers of other average rock size, e.g., Coarse 3, Coarse 4, etc., or the order of layers may be arranged differently with respect to their average rock size. In still other embodiments, the various kinds of coarse need not be arranged strictly in layers. For example, the "Coarse 2" rocks may form a layer with additional pyramid-shaped structures extending above the layer up to and through the ports.

FIG. 13b illustrates construction of such an embodiment similar to construction depicted in FIG. 5, except the sorter of FIG. 13b sorts into multiple streams of coarse rock such as Coarse 1 and Coarse 2. This may be performed using multiple sizes of grizzlies, gravity-sorting, or other techniques well-known to the mining industry. The sorter may also sort into additional streams, e.g., Coarse 3, Coarse 4, etc. appropriate for additional embodiments discussed above.

Note that a body of rocks having smaller average size may be laid above a body of larger rocks: for example, the layers of different size coarse just described, or the container top wall of fines above the coarse reservoir rocks. It is inevitable that some of the smaller rocks will settle down among the larger rocks. There will be a "fuzzy" boundary between the bodies, rather than a sharp boundary as illustrated for clarity in the Figures. This is not a problem as long as the "fuzzy" boundary" region doesn't penetrate all the way through the lower body.

By sorting the rocks into different coarse grades, each coarse grade will have a smaller size distribution of rock sizes within the grade than by merely sorting based on a single minimum threshold size. This smaller variation within each grade leads to greater void fraction within each grade, compared to an alternative in which the grades are intermixed, which can enhance airflow within the reservoir. As the ability of the air to flow within a portion of the reservoir is determined by both the void fraction and the average size of the space between the rocks, the use of layers can be used to determine the path that airflow in the reservoir may take.

For example, where the lowest layer is composed of the largest coarse size, this may encourage airflow towards the bottom of the reservoir, to overcome the naturally tendency of the air to follow the shortest possible path and seek to flow near the top of the reservoir. This could be enhanced by constructing the ports from the largest coarse size in a conical stack that continues to the lowest layer. It will be appreciated that the layers of the different coarse size may be generally horizontal, generally vertical or otherwise as may be suited for a particular installation. Further, where useful for directing airflow, for construction reasons or other reasons, the layers may pass through one another or be non-contiguous.

While this disclosure has been described using certain embodiments, the principles of the present disclosure can be further modified with the spirit and scope of this the teaching herein. This application is therefore intended to cover any variations, uses, or adaptations of the present disclosure that use its general principles. Further, this application is intended to cover such departures from the present disclosure as come within known or customary practices in the art to which this disclosure pertains.

What is claimed is:

1. A mining system comprising:
    ore;
    waste rock, comprising rock removed to access the ore; and
    a thermal storage reservoir which comprises a portion of said waste rock, the waste rock arranged in at least a first layer comprising waste rocks having at least a minimum threshold size such that the layer has a void fraction of space between the individual rocks such that the layer is permeable to airflow; and a container surrounding the waste rock which is relatively impermeable to air flow compared to the layer of waste rock, wherein at least a portion of said waste rock comprises waste rock deposited into a portion of a mine pit; and
    at least a first blower for circulation of air to or from the thermal storage reservoir, such that a flow of tempered air is controllably provided to the thermal storage reservoir to provide thermal energy thereto and a flow of air is controllably provided from the thermal storage reservoir for utilization of tempered air therefrom.

2. The mining system of claim 1, wherein at least one wall of the container is formed from an aggregate containing variable sized waste including small-sized waste rock which is smaller than the at least a minimum threshold size that fill voids between the waste rock meeting the at least a minimum threshold size, thereby making the at least one wall impermeable to airflow relative to the reservoir.

3. The mining system of claim 1, wherein at least one wall of the container comprises bedrock.

4. The mining system of claim 1, further comprising at least one port formed as a hole through a wall of the container which is in airflow communication with the at least a first blower.

5. The mining system of claim 4, wherein the at least one port comprises at least two ports, which are filled by waste rock having a void fraction of space between the individual rocks such that the ports are permeable to airflow.

6. The mining system of claim 1, wherein the flow of tempered air is provided to the thermal storage reservoir by at least a first source of tempered air comprising a solar collection system for heating or cooling air.

7. The mining system of claim 6, wherein the solar collection system comprises a greenhouse or a skyfarm comprising at least one collection tube comprising an upper film and a lower film which define a portion of the at least one collection tube exposed to sky radiation, and a radiant member that responds to the sky radiation to alter the temperature of air within the at least one collection tube.

8. The mining system of claim 7, wherein the radiant member is the upper film or the lower film of the at least one collection tube.

9. The mining system of claim 7, wherein the radiant member is disposed within the at least one collection tube and defines an insulative space between itself and the upper film.

10. The mining system of claim 1, wherein the flow of air is controllably provided from the thermal storage reservoir for utilization of tempered air by at least a first tempered air consumer.

11. The mining system of claim 1, further comprising at least a first tempered air consumer comprising a greenhouse or a community utility which uses tempered air for climate control.

12. The mining system of claim 1, wherein the thermal storage reservoir has at least two ports with a vertical distance therebetween and a mine is in connection to the lower port, such that the upper port may be opened to cause warm air to escape therefrom and withdraw air from the mine through the lower port, thereby clearing air from the mine.

13. A mining system comprising:
    ore;
    waste rock, comprising rock removed to access the ore; and
    a thermal storage reservoir which comprises a portion of said waste rock, the waste rock arranged in more than one layer, each layer having a distinct minimum size threshold such that each layer has a different airflow characteristic; and a container surrounding the waste rock which is relatively impermeable to air flow compared to each layer of waste rock; and
    at least a first blower for circulation of air to or from the thermal storage reservoir, such that a flow of tempered air is controllably provided to the thermal storage reservoir to provide thermal energy thereto and a flow of air is controllably provided from the thermal storage reservoir for utilization of tempered air therefrom.

14. A process for constructing a thermal reservoir during mining remediation, the process comprising:
    sorting waste removed from a mine pit during mining operations into coarse rocks larger than a first minimum size threshold and fine rock smaller than the minimum size threshold;
    filling a portion of the mine pit with the coarse rocks to achieve a void fraction that provides sufficient permeability to airflow to form a thermal reservoir storage body;
    constructing container walls around one or more sides of the thermal reservoir storage body by depositing the fine rock to form an aggregate which is relatively impermeable to airflow;
    forming at least one port through a container wall through which air can flow to or from the thermal reservoir storage body;

connecting at least a first tempered air source to the thermal storage reservoir to provide for a controlled flow of tempered air to the thermal storage reservoir; and connecting at least a first tempered air consumer to the thermal storage reservoir for utilization of tempered air from the thermal storage reservoir.

15. The process of claim 14, wherein constructing container walls around one or more sides of the thermal reservoir storage body by depositing the fine rock to form an aggregate which is relatively impermeable to airflow comprises depositing the fine rock together with unsorted raw waste.

16. The process of claim 14, further comprising calculating the size and sorting of the waste for construction of the reservoir to use waste during construction to minimize excess waste, using the formula: $Krc=\{Vc-Vr*[(1-Kvr)/(1-Kvc)]*[Kfr/(1-Kfr)]\}/Vc$ where Krc is the fraction of raw waste in the container wall, Vr is the volume of reservoir, Vc is the volume of container walls, Kvr is the void fraction of the reservoir, Kvc is the void fraction of container walls, and Kfr is the mass fraction of fine rock generated by sorting raw waste.

17. The process of claim 16, wherein Krc is calculated to be less than about 35%.

18. The process of claim 14, wherein constructing container walls around one or more sides of the thermal reservoir storage body by depositing the fine rock to form an aggregate which is relatively impermeable to airflow is conducted concurrently with filling a portion of the mine pit with the coarse rocks to achieve desired void fraction and permeability to airflow to form the thermal reservoir storage body.

19. The process of claim 14, wherein sorting waste removed from a mine pit during mining operations into coarse rocks larger than a first minimum size threshold and fine rock smaller than the minimum size threshold comprises sorting waste removed from a mine pit during mining operations into coarse rocks larger than a first minimum size threshold of about 0.1 meter.

20. The process of claim 19, wherein sorting waste removed from a mine pit during mining operations into coarse rocks larger than a first minimum size threshold and fine rock smaller than the minimum size threshold comprises sorting waste removed from a mine pit during mining operations into coarse rocks larger than a first minimum size threshold of about 0.3 meter.

21. The process of claim 14, wherein forming at least one port through a container wall through which air can flow to or from the thermal reservoir storage body comprises depositing coarse rocks larger than a first minimum size threshold to an elevation equal to a container top wall top surface, such that the deposition of coarse rocks assumes an angle of repose which forms a port body having a truncated triangular cross section, then depositing fine rock and unsorted waste to form the container top wall over sides of the port body.

22. The process of claim 14, wherein constructing container walls around one or more sides of the thermal reservoir storage body by depositing the fine rock to form an aggregate which is relatively impermeable to airflow comprises depositing a first layer of the fine rock then placing an air-impermeable membrane over the first layer and then depositing a second layer of the fine rock to form an aggregate which is relatively impermeable to airflow over the air-impermeable membrane.

* * * * *